US009747456B2

(12) United States Patent
Arasu et al.

(10) Patent No.: US 9,747,456 B2
(45) Date of Patent: Aug. 29, 2017

(54) SECURE QUERY PROCESSING OVER ENCRYPTED DATA

(71) Applicant: Microsoft Corporation, Redmond, WA (US)

(72) Inventors: Arvind Arasu, Redmond, WA (US); Shriraghav Kaushik, Bellevue, WA (US); Ravishankar Ramamurthy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 13/831,616

(22) Filed: Mar. 15, 2013

(65) Prior Publication Data

US 2014/0281512 A1   Sep. 18, 2014

(51) Int. Cl.
*G06F 21/60* (2013.01)
*H04L 29/06* (2006.01)
*G06F 21/62* (2013.01)

(52) U.S. Cl.
CPC ........ *G06F 21/602* (2013.01); *G06F 21/6245* (2013.01); *H04L 63/045* (2013.01); *H04L 63/0428* (2013.01); *H04L 63/062* (2013.01); *H04L 2463/062* (2013.01)

(58) Field of Classification Search
CPC ...... G06F 21/60; G06F 21/62; G06F 21/6218; G06F 21/6227; G06F 21/6245; G06F 21/6254; G06F 21/602; H04L 63/0407; H04L 63/0428; H04L 9/0662; H04L 9/0894; H04L 9/0643; H04L 9/085

USPC .............. 713/168, 189, 190; 726/26, 29, 30; 380/33, 44, 265
See application file for complete search history.

(56) References Cited

U.S. PATENT DOCUMENTS

| | | | |
|---|---|---|---|
| 8,291,509 B2 * | 10/2012 | Kerschbaum et al. ......... 726/30 |
| 2008/0133935 A1 * | 6/2008 | Elovici ............... G06F 21/6227 713/193 |
| 2009/0077378 A1 * | 3/2009 | Hacigumus et al. ......... 713/165 |
| 2013/0191650 A1 * | 7/2013 | Balakrishnan et al. ...... 713/190 |

OTHER PUBLICATIONS

Bajaj et al., "TrustedDB: A Trusted Hardware based Database with Privacy and Data Confidentiality", SIGMOD'11, Jun. 12-16, 2011).*
"Private Record Matching Using Differential Privacy" Inan et al., EDBT 2010, Mar. 22-26, 2010, Lausanne, Switzerland.*

(Continued)

*Primary Examiner* — Noura Zoubair

(57) ABSTRACT

The subject disclosure is directed towards secure query processing over encrypted database records without disclosing information to an adversary except for permitted information. In order to adapting semantic security to a database encryption scheme, a security model for all query processing is specified by a client and used to determine which information is permitted to be disclosed and which information is not permitted. Based upon the security model, a trusted, secure query processor transforms each query and an encrypted database into secure query results. Even though the adversary can view the secure query results during communication to the client, the adversary cannot determine any reliable information regarding the secure query results or the encrypted database.

20 Claims, 6 Drawing Sheets

(56) References Cited

OTHER PUBLICATIONS

"International Preliminary Report on Patentability Issued in PCT Application No. PCT/US2014/025126", Mailed Date: Jun. 23, 2015, 7 Pages.

"International Search Report and Written Opinion Issued in PCT Patent Application No. PCT/US2014/025126", Mailed Date: Dec. 1, 2014, 10 Pages.

Popa, et al., "CryptDB: Protecting Confidentiality with Encrypted Query Processing", In Proceedings of the Twenty-Third ACM Symposium on Operating Systems Principles, Oct. 23, 2011, 16 Pages.

Boneh, et al., "Remote Oblivious Storage: Making Oblivious RAM Practical", Published on: Mar. 3, 2011 Available at: http://hdl.handle.net/1721.1/62006.

Bender, et al., "Cache-Oblivious Streaming B-trees", In Proceedings of the 19th Annual ACM Symposium on Parallel Algorithms and Architectures, Jun. 9, 2007, 12 Pages.

Pinkas, et al., "Oblivious RAM Revisited", Advances in Cryptology—Lecture Notes in Computer Science, Aug. 15, 2010, 18 Pages.

\* cited by examiner

SECURE QUERY PROCESSING OVER ENCRYPTED DATA

BACKGROUND

An organization typically stores a considerable amount of enterprise data and naturally, data security/privacy during data storage and communication is a serious concern. A typical adversary, for the sake of simplicity, is an entity, such as a person or a group of people, capable of intercepting and viewing at least a portion of the organization's data that is transmitted between the organization and the organization's users/members.

Cloud computing environments provide additional challenges, such as when data is migrated to a cloud database management system (DBMS) from an on-premises computing system. Some challenges relate to database encryption, where sensitive columns are encrypted before being stored in the cloud resource. Assuming that the adversary cannot decipher any portion of encrypted data, without access to an appropriate encryption key, the encrypted data can still reveal information that compromises data security. For example, deterministic encryption schemes potentially allow an adversary to learn plain-text values using various surreptitious techniques. Conventional encryption schemes also make it difficult to perform computations without temporarily decrypting the data. These challenges make it difficult to provide a secure database-as-a-service paradigm in the cloud computing environment.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards secure query processing over encrypted data without disclosing information, except for permitted information. In one aspect, a client machine specifies in a security model which information is permitted and which is not permitted to be disclosed during query processing. The client machine establishes the security model with an untrusted component and a trusted component of a secure query processing system. In one aspect, a driver running on the client machine translates the set of queries into secure query plans that follow the secure model. The driver generates the secure query plans, including by replacing insecure operators with secure operators that are implemented by the trusted component of the secure query processing system.

In one aspect, the trusted component is configured to support the security model by producing secure query results for the secure query plans. The secure query results comply with the security model and only reveal information permitted by the client machine. In one aspect, the client machine establishes the security model specifying column-level security settings.

In one aspect, the untrusted component includes an untrusted server running on a network resource for storing the client machine's data and providing the client machine with secure query results that complies with the security model. The untrusted server instructs a secure query processor, which is one trusted component of the query processing system, to execute secure operators corresponding to the secure query plans and produce column data while hiding data access patterns of reads/writes to a disk comprising the encrypted database. In one aspect, the secure query processor pads the column data to conceal a cardinality of the column data and then, encrypts the column to produce secure query results prior to communication to the client machine.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
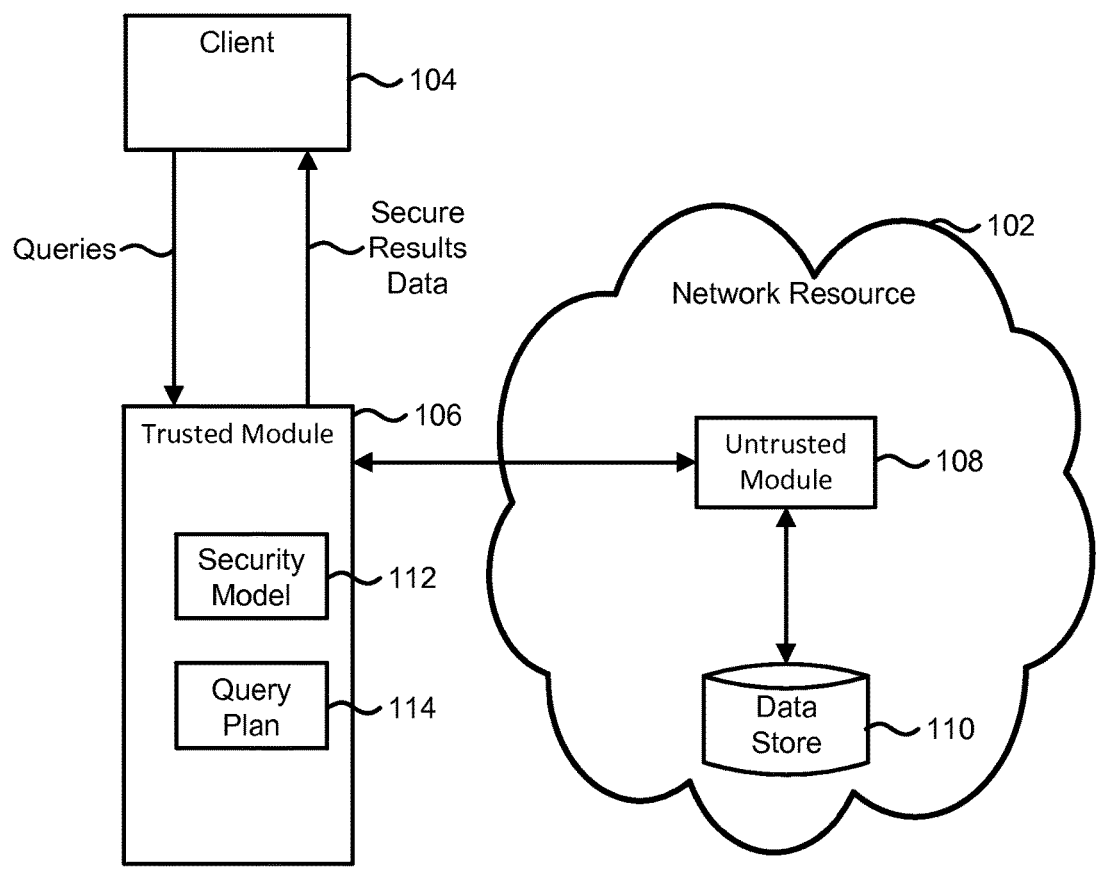
FIG. 1 is a block diagram illustrating example architecture for adapting semantic security to an encryption scheme according to one example implementation.

Various aspects of the technology described herein are generally directed towards a query processing system that is configured to adapt semantic security to a database encryption scheme and provide secure query results without revealing information to an adversary, except for permitted information as specified by a security model. To formalize preventable information disclosure, the query processing system is configured to be semantically secure if no adversary can compute a polynomial-time function over an original plain-text, unencrypted database, except for information allowed by a permit function. Example components of the query processing system represent an end-to-end architecture over which secure database operators evaluate arbitrary queries (e.g., SQL queries).

Using the security model, one or more trusted components and one or more untrusted components of the secure query processing system reduce/prevent undesired information disclosure by adapting semantic security to a database encryption scheme. Queries and/or database column data communicated between the at least one trusted component and the at least one untrusted component can disclose protected/confidential information to listening adversaries even if such data is strongly encrypted at all times. Implementing the security model limits or prevents such information disclosure by specifying which information is not permitted to be leaked and/or is permitted to be leaked.

One example security model stipulates that by conducting and/or accessing a query trace, the adversary gains no more information than what can be learned from the encrypted data. For efficiency, not all data needs to be protected in this way and thus, the security model allows for excepting specified data, corresponding to information generated by a permit function. The permit function specifies what information the query processing system is allowed to reveal. One example implementation of the permit function generates a binary string encoding of permitted information by evaluating a set of cleartext queries using a cleartext database, comparing query results with the security model and encoding each permitted data item corresponding to the query results. Based upon the permitted information, the secure query processor determines how to modify the query results to comply with the security model.

Based upon the security model, one example trusted component herein referred to as a secure query processor configures executable secure operators that perform database-related commands, such as filter, select, join, anti-join, project, group by aggregation, sort, merge and/or the like. These secure operators produce secure query results in compliance with the security model. Each secure operator may be implemented for various levels of security in which each level prescribes which information about query results is not to be revealed. Some security models, for example, specify that only an output size of the query results is permitted to be disclosed.

The secure query processor outputs a stream of one or more records in response to a query or, if no records match that query, an empty stream. One example implementation re-encrypts the stream of records prior to being communicated to the requesting client machine in order to hide correspondence between an input stream of records and the output stream of records. By way of an example, the secure query processor implements a non-deterministic encryption scheme that produces different/pseudorandom ciphertexts for a same database record. Another example implementation increases a cardinality of the output stream by padding the output stream with dummy records. Yet another example implementation buffers the output stream based upon a selectivity factor and communicates only a specific number of records at each interval.

In addition to on-premises servers, public/private/hybrid cloud computing environments constitute example embodiments for a network resource on which the client machines' data is stored and database services are provided. In one example implementation where the client machines do not trust the network resource (e.g., public cloud), the untrusted component includes a database management system configured to run on a server within the network resource. Via the secure query processor, the database management system executes queries on behalf of the client machines. In addition to secure query processing, the database management system provides the client machines with database services over a network, including indexing, buffer pools, disk access and/or the like.

To illustrate one example of secure query processing in which an encrypted database stores patient information, consider that the client machine issues a filter query selecting database records for patients that are thirty-five in age, and in response, receives a non-empty output stream of query results. Because the adversary can ascertain a size of the output stream, as described herein, the secure query processor inserts dummy records into the output stream; otherwise the adversary can determine exactly how many patients are thirty-five years old based upon the output size. In one example implementation, instead of communicating the output stream in entirety, the secure query processor may buffer the output stream one portion at a time for communication to the client machine. It is appreciated that concealing the output stream cardinality can be accomplished for other query types besides the filter query. Furthermore, in order to prevent a sequence/pattern of memory locations accessed during the filter query from revealing certain information, such as an ordering of the input stream, the secure query processor may randomly permute database records in the output stream. An alternative/additional mechanism may randomize data block access requests to a disk in order to conceal an ordering of the output stream.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and query processing in general.

FIG. 1 is a block diagram illustrating example architecture for a secure query processing system according to one example implementation. Elements of the example architecture include untrusted components, such as a network resource 102, and trusted components, such as a client 104 and a trusted module 106. Running within the network resource 102, an untrusted module 108 uses the trusted module 106 when handling secure query processing over a data store 110 on behalf of the client 104.

According to one example implementation, the trusted module 106 provides the untrusted module 108 with an interface for calling secure scan-based operators, including operators based upon arbitrary SQL database operations. The trusted module 106 may provide functionality for decrypting database column data within a trusted domain/component and suitably re-encrypt secure operator output and/or hide access patterns.

To illustrate one example of encrypted data envisioned by the present disclosure, the untrusted module 108 may utilize one or more compatible computing hardware/software components to execute a non-deterministic and/or pseudorandom encryption scheme in which identical unencrypted or cleartext data is encrypted as different ciphertext data. According to one example implementation, the data store 110 comprises a number of databases, one or more of which may be encrypted as determined by such an encryption scheme. Optionally, a cleartext copy of the at least one database also may be stored within another data store, such as a trusted data store within a trusted computer.

One or more example implementations of a security model 112 specify which information is permitted and/or not permitted to be disclosed or leaked when a polynomial-time running adversary is able to access/view the ciphertext data communicated between the encrypted database and the client 104. In addition to determining the above permitted information, the trusted module 106 executes a query plan 114 and produces a query trace that includes skeleton information, a sequence of database records being fetched from a disk, indicia as to whether or not a particular record is being sent to the trusted component, and a response of the trusted component for that record. The security model defines the query trace as a scope of the query evaluation of which the polynomial-time adversary may observe/compute.

In one example implementation, the security model 112 builds a secure B-Tree index over encrypted database columns within the data store 110. One example implementation of the secure B-Tree uses Oblivious RAM (ORAM) technology to make data accesses appear random to the polynomial-time adversary. Hence, the trusted module 106 supports point and range lookups over column data encrypted using an available CPA-secure encryption. The trusted module 106 performs query optimization by determining security indicia associated with the query plan 114 by determining whether each operator is secure on a per-operator basis.

The client 104 may instantiate the security model 112 to specify what information can and/or cannot be leaked during query processing. Using a permit function, one example implementation of the trusted module 116 parameterizes such information in an encoded binary string. The security model 112 is orthogonal to base data encryption and therefore, applicable for securing any configuration of base data encryption that might combine plain-text, deterministic, order-preserving and strong CPA-secure encryption schemes. The security model 112 is applicable to query processing architectures that perform secure computations in the client 104, in trusted hardware, or a hybrid of the two.

Figure 2:
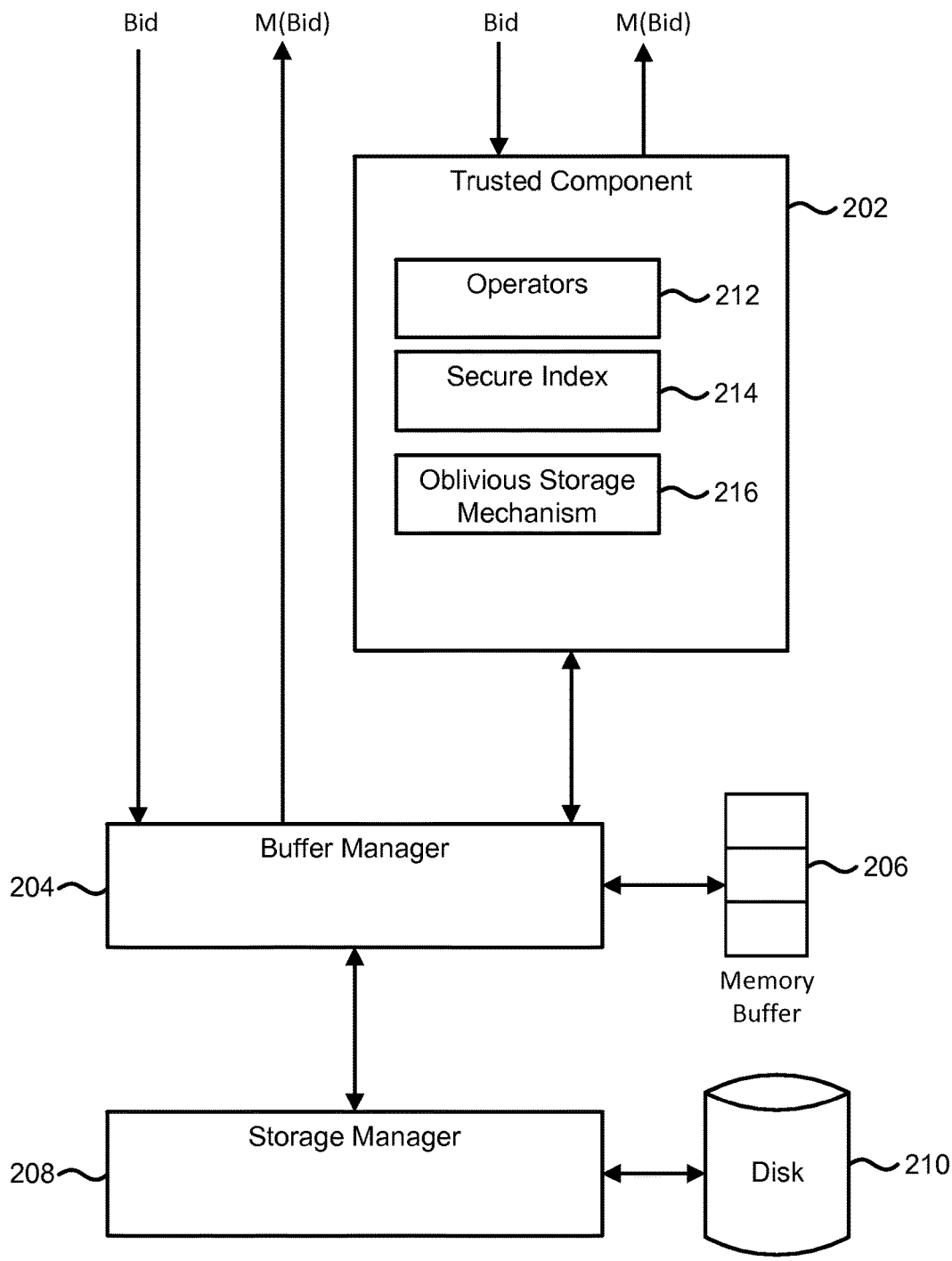
FIG. 2 is a block diagram illustrating secure indexing for an example secure query processing system with according to one example implementation.

FIG. 2 is a block diagram illustrating secure indexing for an example secure query processing system with according to one example implementation. A trusted component 202 of the example secure query processing system performs secure index construction/lookup in a manner that reveals little or no information during query evaluation. Using a buffer manager 204, the trusted component 202 (e.g., the trusted module 106 of FIG. 1) conceals, from a polynomial-time adversary, data accesses to data blocks within a memory buffer 206 according to one or more example implementations. The typical adversary, referred to herein as a polynomial-time adversary, is configured to run a polynomial-time algorithm over those data blocks (e.g., binary strings).

Via a storage manager 208, the buffer manager 204 retrieves from a disk 210 data blocks comprising database records from the disk 210 storing one or more encrypted databases. One example implementation includes a Database Management System (DBMS) in which the buffer manager 204 provides indexed read/write access to blocks on a disk being managed by the storage manager 208 as well as main memory buffer pool caching. In response to a block identifier (id), the buffer manager 204 accesses physical storage space, retrieves a data block corresponding to the block id and communicates the data block to the trusted component 202 and/or one or more applications running on client machines.

The database management system, utilizing the trusted component 202, executes secure query plans including scan-based query plans for decision support queries. Some leaf elements (e.g., nodes) of these query plans include scan-based operators 212, such as those described herein. Although the following description refers to certain relational database operations, such as a filter, a sort, a foreign key join operator and a grouping-aggregation operator, other types of operators, for example, an anti-join operator or an update operator, are compatible with the trusted component 202 of the secure query processing system. As an example, the secure filter operator commences by randomly permuting the records in the memory buffer 206, which may be performed by one or more untrusted components, such as the buffer manager 204 or the storage manager 208. As described herein, even if the polynomial-time adversary has full knowledge of the permutation, the cleartext data within the disk 210 cannot be compromised. According to one example mechanism for outputting database records at a fixed rate, the trusted component 202 stores only a certain number of records in the memory buffer 206.

In order to lookup entries of a secure index 214, according to one example implementation, the trusted component 202 adapts a B-tree index lookup procedure for secure query processing by utilizing a storage system referred to herein as an oblivious storage mechanism 216 (e.g., oblivious storage system (OSS)). One or more example implementations encrypt input blocks ids using CPA-secure encryption to prevent the adversary from gleaning the block ids. For each set of input records, the oblivious storage mechanism 216 randomizes data block read/write requests to the buffer manager 204 such that columns are distinguishable from each other based upon distributions of read/write requests.

The oblivious storage mechanism 216 is isomorphic to Oblivious RAM (ORAM) functionality; any ORAM-based solution constitutes an operable embodiment of the oblivious storage mechanism 216. These solutions may involve shuffling physical data blocks around and making additional "spurious" disk accesses to hide the actual disk access pattern. The oblivious storage mechanism 216 may be configured to perform an oblivious sorting operation while revealing a same disk access pattern for a particular input size regardless of the values in the input stream. Hence, the adversary cannot ascertain actual values from comparisons between database records because for each oblivious sort, the adversary views an indistinguishable pattern of reads/writes to the disk 210. Note that above strategy implies that the block ids that exist above the oblivious storage mechanism 216 layer are virtual ids and the data block corresponding to a given block id is stored in different physical locations at different times.

Figure 3:
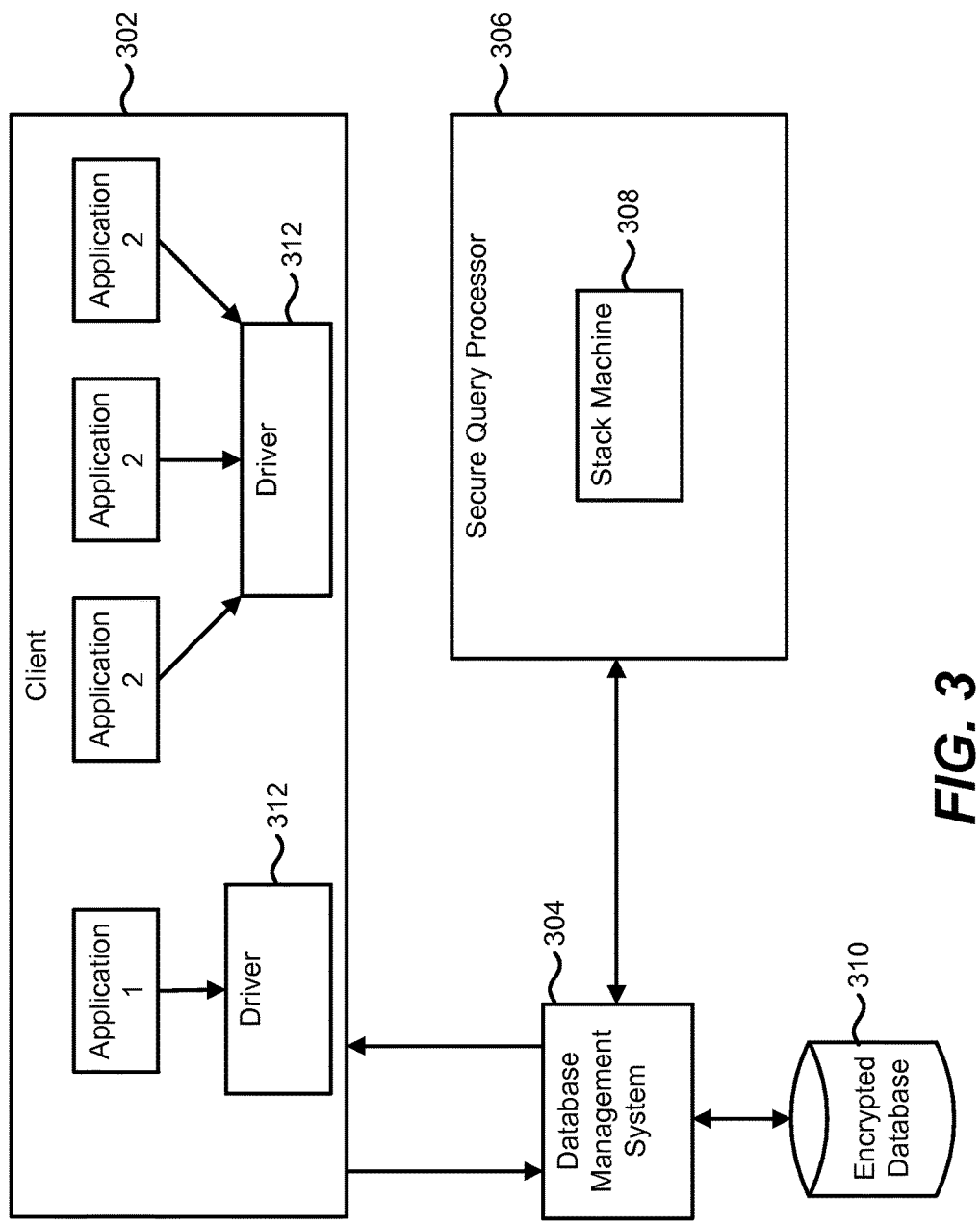
FIG. 3 is a block diagram illustrating trusted hardware for an example secure query processing system according to one example implementation.

FIG. 3 is a block diagram illustrating trusted hardware for an example secure query processing system according to one example implementation. The trusted hardware may integrate with custom-designed and/or commodity hardware.

Applications running within client machines, such as a client 302, issue SQL queries using, an ODBC driver, embedded SQL, or a console/interface to a database management system 304 that is configured to extend functionality between the ODBC driver at the client 302 and a secure query processor 304. FIG. 3 depicts these applications as "Application 1" and "Application 2." One embodiment of the database management system 304 includes Microsoft® SQL Server®.

The database management system 304 instructs a secure database processor, such as a secure query processor 306 implementing a stack machine 308, to evaluate queries on strongly encrypted records within an encrypted database 310. The stack machine 308 also may be configured to evaluate queries on database records comprises encrypted column data and unencrypyted/cleartext column data by executing the secure scan-based operators on the encrypted column data and executing traditional scan-based operators on the cleartext column data. As an example, if the encrypted column data is treated as a blob, the traditional operators over the cleartext column data also are secure.

A driver 312 running within the client 302 may extend basic ODBC functionality by, for example, persisting a symmetric encryption key (e.g., a 128-bit key) for each application running on the client 302 or on a cloud resource and using such a key to decrypt/encrypt various data (e.g., statements, tuples, query results, constants, parameter settings and/or the like) of queries and/or updates. The driver 312 also may be configured to perform query optimization because statistics (e.g., histograms) used for query optimization reveal information about underlying database records.

The driver 312 at the client 302 handles SQL statements, which involves communicating the query plan for processing by the database management system 304 running within a server, and awaits secure query results. The database management system 304 includes various components, such as a storage manager that performs input/output (I/O) of data blocks to/from disks, a transaction manager and one or more query processors (e.g., an optimizer, a runtime system and/or the like). The storage manager assumes control over buffer pools, database table indexes and/or the like. The transaction manager performs concurrency control, write-ahead logging and/or the like.

To improve compilation performance, the driver 312 locally caches database related metadata and statistics. An original copy of such database related metadata and statistics are stored, in encrypted form, by the database management system 304 in compliance with the confidentiality requirements of the application as specified in the security model. The database management system 304 receives a query plan from the driver 312, interprets the query plan using iterators, applies any updates to the encrypted database 310, and returns secure query results to the client 302 in compliance with the security model.

The query plan may include one or more SQL statements, which are database operations comprising one or more scan-based operators. The following numbered steps below represent one example of a scan-based operator, referred to herein as a SecureFilter function $\sigma_P(T)$, that evaluates a secure filter query over an input stream of database records T and outputs those records that satisfy a filter predicate P:

```
1: procedure SecureFilter(T; P; M_t)
2: OutQueue -
3: for i = 1 to n do
4:   r_i = Dec(r̄_i)
5:   if r_i satisfies filter predicate P then
6:     r̄_1' ← Enc(r_i)
7:     OutQueue:Enqueue(r̄_1')
8:   end if
9:   if i ≥ α M_t/2 and α | i then
10:    Output OutQueue:Dequeue( )
11:  end if
12: endfor
13: Output remaining records in OutQueue
14: end procedure
```

In order to secure the filter operator and hide storage access patterns, according to one example implementation, the database management system 304 randomly permutes the input stream of records T and executes the SecureFilter function over the randomly permuted stream of $T = \bar{r}_1, \ldots, \bar{r}_n$ where P has a selectivity of $1/\alpha$ and $M_t$ is an available memory capacity in the secure query processor 306. Overhead related to increasing a number of iterations over the input records and/or randomly permuting the input records is generally not significant. One alternative implementation produces a filtered record at a fixed rate that is a function only of an output size. In order to ensure a fixed rate of output records, the secure query processor buffers records in an internal or external memory buffer.

The database management system 304 may iteratively input the randomly permuted records to the secure filter operator within the stack machine 308, as described below with respect to the above SecureFilter function in which $r_i$ denotes a record and $\bar{r}_i$ denotes the encryption of $r_i$. For any record $r_i$ that satisfies the filter predicate P at numbered step five (5), the SecureFilter function re-encrypts the record $r_i$ using a symmetric encryption key and buffer the resulting record $\bar{r}_i$ in a memory buffer. The symmetric encryption key is typically known to the client 302 or another party requesting secure query results. After an initialization phase that lasts around half of $M_t$ input records, where $M_t$ refers to an available memory capacity of the secure query processor 306, buffered records are communicated as output at a fixed rate of one (1) record for every α input records. After all the input records T have been processed, the secure query processor 306 communicates any remaining buffered record to the database management system 304, which communicates each record back to the client 302 as query results.

The security of the secure filter operator follows from the observation that the input and output pattern of records to and from the secure query processor 306 depend on n and α; note that the adversary is permitted to view α because α is the ratio of n and the filter output size. Furthermore, because the output records are re-encrypted prior to communication to the database management system 304, the adversary cannot determine any relationship between the output records and the input records.

Referring to the steps of the SecureFilter function described above, the secure filter operator fails if OutQueue is empty when dequeueing is attempted in Step 10 and OutQueue uses up all $M_t$ memory when enqueueing is attempted in Step 7. For example, if all the records passing the filter occur towards the end, OutQueue is empty when $$i = \alpha \frac{M_t}{2}.$$

One purpose of the random permutation is to ensure that records that satisfy the filter predicate P are evenly spread out rendering such failure unlikely. One example implementation stores base table tuples randomly permuted and avoids random permutation when executing filter operators over base tables.

According to an alternative implementation of the secure filter operator, the SecureFilter function utilizes an oblivious sorting mechanism to filter database records matching a filter predicate P. The database management system 304 may initially call the SecureFilter function one encrypted database record at a time, which causes the secure query processor 306 to decrypt the database record into cleartext column data, scan the cleartext column data for an attribute that matches the predicate P, add an encrypted flag (e.g., Boolean flag) to that record indicating whether or not the record matches the predicate P, and finally return the database record. Because one record is returned as output for each record of input, the adversary cannot learn how many database records match the filter predicate nor ascertain any other information regarding secure filter results. The database management system 304 proceeds to call each remaining database record of an input stream of database records to be scanned and filtered.

In one example implementation, the database management system 304 generates an output stream comprising the returned database records and instructs the secure query processor 306 to perform an oblivious sort on the encrypted flags within the output stream such that all matching database records, if any, are grouped together and all non-matching database records are grouped together. Accordingly, the database management system 304 may separate the matching database records from the non-matching records and communicate only the matching database records. Alternatively, the database management system 304 communicates the sorted output stream until a non-matching record is detected. The database management system 304 may communicate the entire sorted output stream along with encrypted metadata indicating which index separates the matching records from the non-matching records. Regardless of the implementation, the adversary is unable to determine a size of the matching records.

Another example scan-based operator, referred to herein as a secure sort operator, sorts an input stream of records based on a binary comparison function defined over all database records in the encrypted database 310. The secure sort operator is used to implement an ORDER BY clause in SQL and also as a sub-primitive in join and group by operators. The stack machine 308 runs an external memory oblivious sorting algorithm, which by definition maintains data access patterns independent of data values and when combined with a CPA-secure encryption scheme, correctly configures the secure sort operator.

A foreign key join operation—another example secure operator—of database record input streams R and S comprising records $r_1, \ldots, r_n$ and $s_1, \ldots s_m$, respectively, on some attribute A. The foreign key join operation is configured to replace a sort step in a sort-merge join with a secure sort step and securely sort a union of two input record streams while retaining, for each tuple, a relationship with the database table from which the tuples originated. Since the sort operator places joining records together, the secure query processor 306 returns buffered and re-encrypted joined records.

As an example, each of the input streams R and S represent records in a particular database table and, assuming R is the table with the encryption key, the secure query processor 306 computes a standard union U. For each tuple, the secure query processor retains a relation with the table from which the tuple originated. For example, bit 0 corresponds to R tuples and bit 1 designates S tuples. If R and S tuples have different lengths, the secure query processor 306 uses padding to ensure tuples in union U have the same length.

The secure query processor 306 performs a secure-sort the union U on <A, Id>. By using Id in the sort attribute list, if an R tuple and an S tuple agree on the attribute A value, the (unique) R tuple occurs before in the sort ordering. The secure query processor 306 implements the "merge" step by iterating over the tuples in union U. It can be shown that any S tuple <s, 1> in U joins with the most recent R tuple in union U or does not join with any R tuple; this property can be used to generate <r,s> tuples in the join output. To hide access patterns, the secure query processor 306 produce dummy output tuples when reading an R tuple or an S tuple that does not produce a join output. The dummy tuples are removed using a secure filter.

Regarding the security of the join operator, the input and output patterns of the union step, secure sort step and the merge step do not depend on data values in R and S. Encrypting the data values ensures that at the end of the sort step, the adversary cannot find the correspondence between tuples in the standard union U and the input tuples in R and S. Improving an efficiency of the overall join operator may be accomplished by computing union in the database management system 304 and slightly modifying the sort step to encrypt Id column and perform padding.

Figure 4:
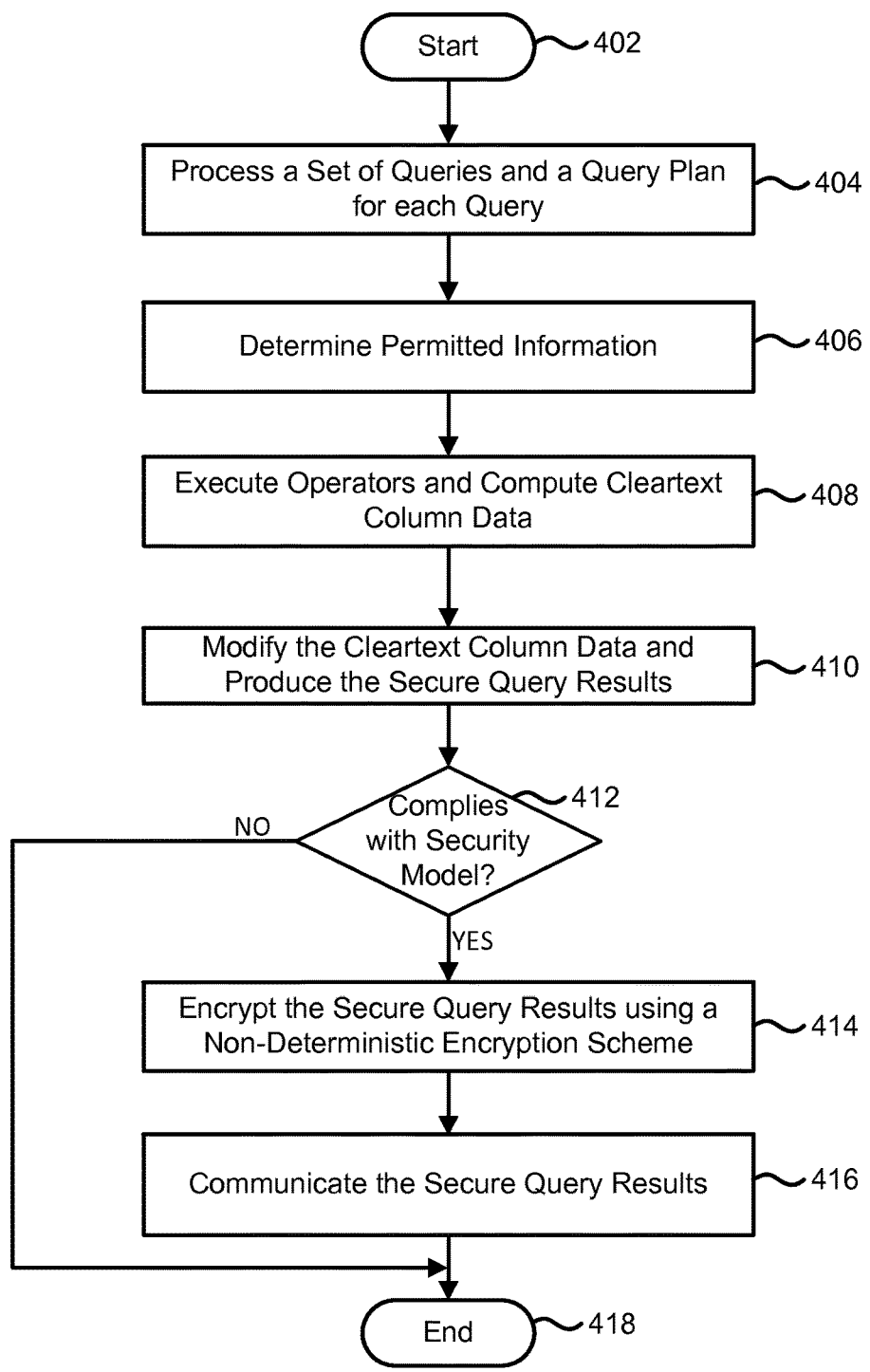
FIG. 4 is a flow diagram illustrating example steps for transforming a set of queries into secure query results according to one example implementation.

FIG. 4 is a flow diagram illustrating example steps for adapting semantic security to an encryption scheme according to one example implementation. One or more hardware/software components (e.g., a trusted module 106 of FIG. 1) may be configured to perform the example steps. Step 402 commences the example steps and proceeds to step 404 where a set of queries and a query plan for each query is processed. Each query plan may include a statement/expression comprising database operations producing secure query results that do not reveal any information in noncompliance with a security model. One example hardware/software component includes a trusted component storing code that when executed, performs one or more secure operators corresponding to these database operations as described herein.

Step 406 determines permitted information for the set of queries. According to one example implementation, the permitted information indicates what data can be revealed to an adversary while maintaining semantic security. A permit function generates a binary encoding of information that complies with a security model (e.g., the security model 112 of FIG. 1), which indicates column-level restrictions on database records as defined by a client machine running applications. The client machine specifies each portion of a user's security model using an internal trusted component (e.g., a driver) that properly instructs an untrusted component herein referred to generally as a database management system. Another example implementation performs a query trace that formalizes information made available to adversary through query evaluation. It can be assumed that the adversary has administrative privileges to the database management system and monitors the communication to and from the trusted component. The query trace may include the following events happening inside the database management system: the sequence of instructions executed, the sequence of memory accesses (at every level of the memory hierarchy including disk), and all communication to and from the trusted component.

Step 408 executes the secure operators corresponding to the query plans, as instructed by the database management system, and computes cleartext column data. According to one or more example implementations, the database management system calls functions provided by a stack machine and communicates one or more input streams of database records. Each input stream may correspond to database records or tuples comprising a portion of a table or multiple tables.

Step 410 refers to modifying the cleartext column data and producing secure query results for communication to the client. One example implementation pads the cleartext column data with dummy columns in order to conceal an output size of the secure query results. Another example implementation randomizes an ordering of the cleartext column data, if feasible. Step 412 represents a determination as to whether the secure query results column data complies with the security model. One example implementation compares the cleartext column data with the permitted information and identifies events related to information disclosure, if any, beyond the scope of the permitted information. If evaluating query to identify the cleartext column data does not reveal any information except for the permitted information, step 410 proceeds to step 412. If the query evaluation is insecure, step 410 proceeds to step 418 where the example steps terminate.

Step 414 encrypts the secure query results using a non-deterministic encryption scheme. Step 416 communicates the secure query results to the requesting client machine. One example implementation buffers a portion of the encrypted column data, communicates the buffered portion and repeats these steps until all of the encrypted column data is communicated. Step 418 terminates the example steps depicted in FIG. 4.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
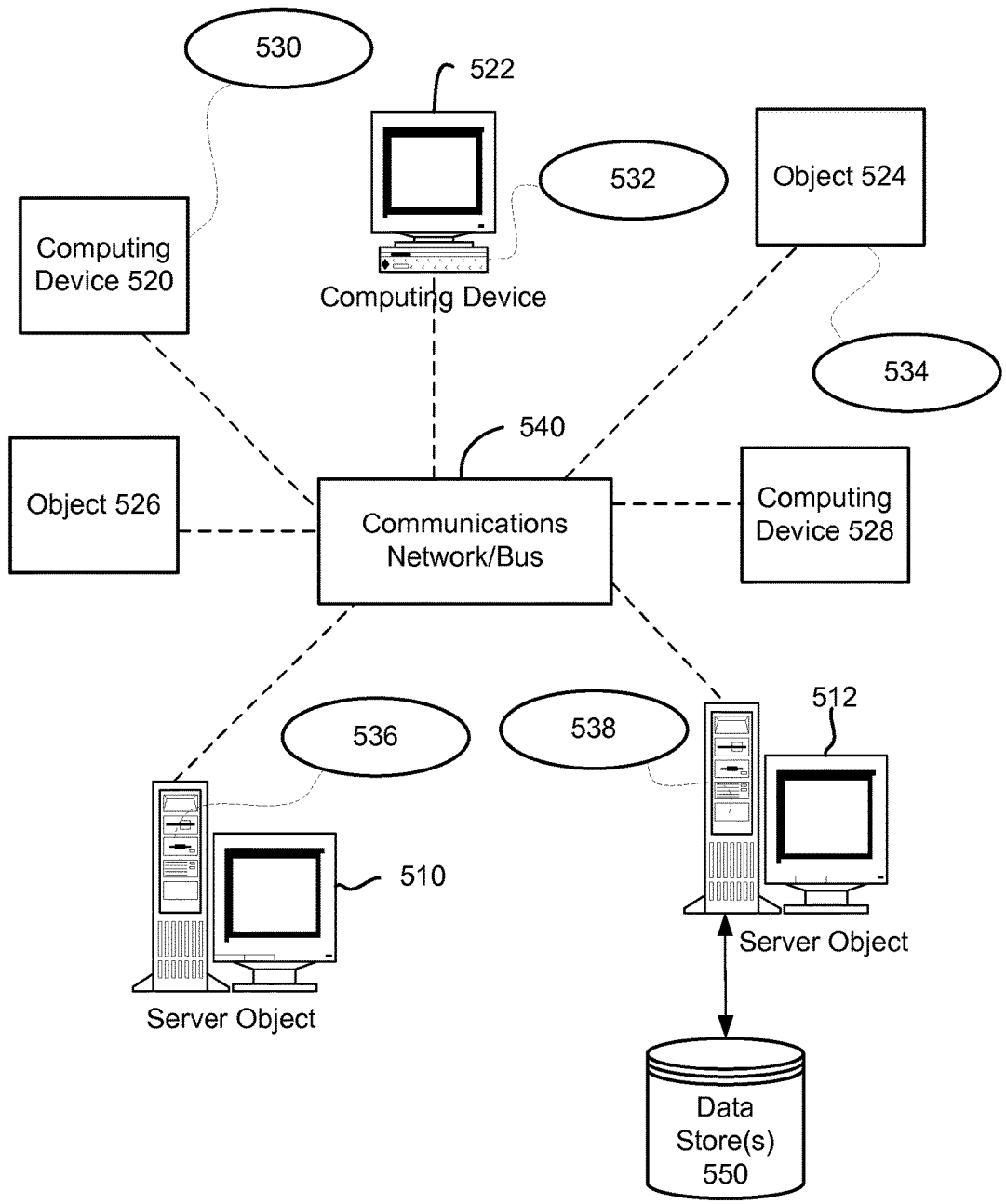
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
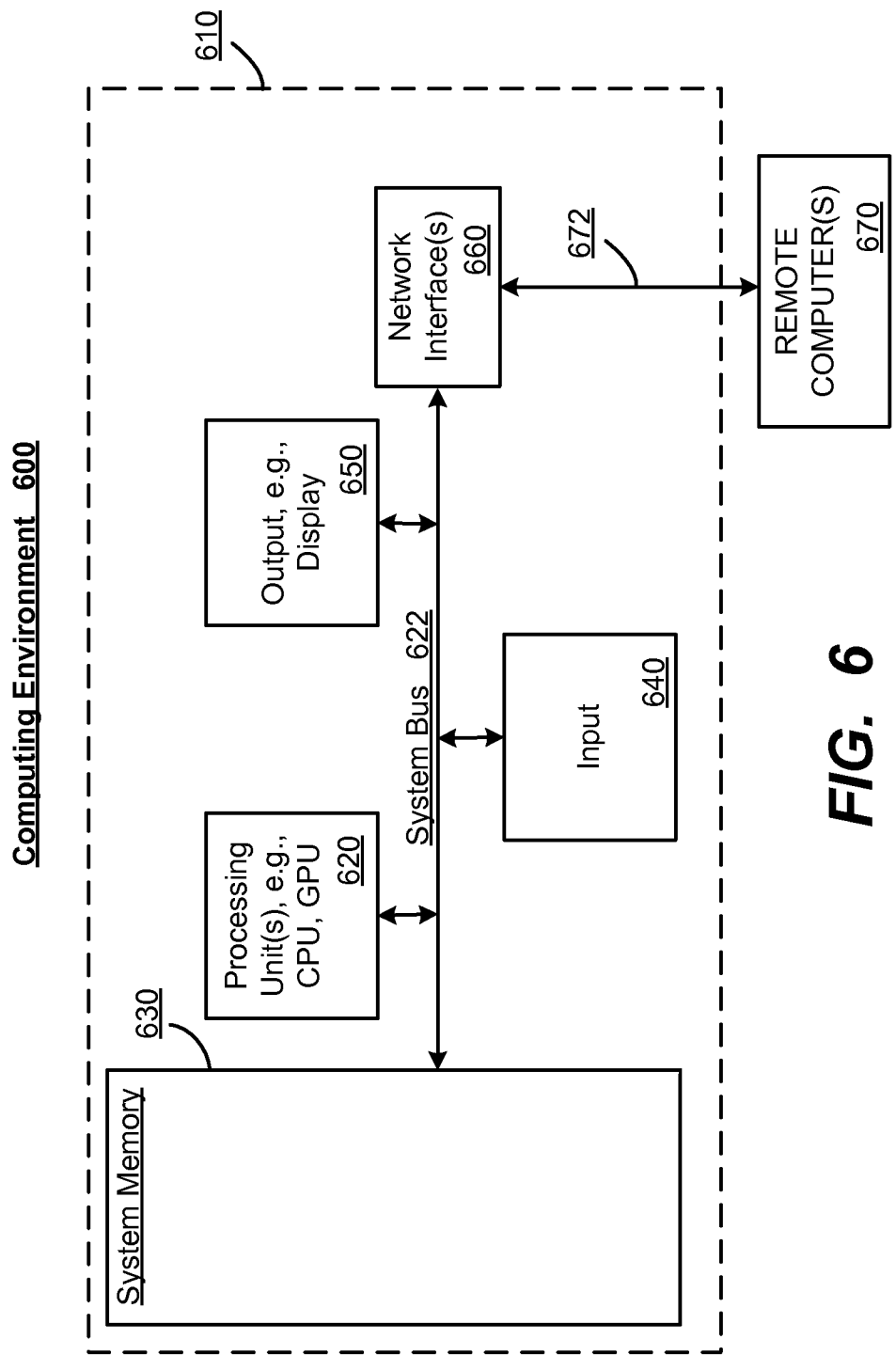
FIG. 6 is a block diagram representing an example non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for adapting semantic security to a database encryption scheme to prevent information disclosure in a query processed at least in part on at least one processor of a secure query processing system comprising a trusted component and an untrusted component, the untrusted component including an encrypted database with the database encryption scheme, the method comprising:
    receiving, from a client device different from the trusted component, one or more query plans corresponding to a query;
    using a security model on the encrypted database to identify first information in the encrypted database permitted for disclosure and second information in the encrypted database not permitted for disclosure, the security model established with the trusted component and the untrusted component;
    determining that encrypting cleartext data in accordance with the one or more query plans would result in encrypted cleartext data which reveals information corresponding to the second information in the encrypted database not permitted for disclosure;
    based on the determining, generating, at the trusted component, modified cleartext data based on the cleartext data in accordance with the one or more query plans, the modified cleartext data including a modified portion corresponding to the second information in the encrypted database not permitted for disclosure such that, upon encryption of the modified cleartext data, the encrypted modified cleartext data does not disclose the second information;
    encrypting the modified cleartext data in compliance with the security model to produce secure query results that do not disclose the second information in the encrypted database, the secure query results including the encrypted modified portion of the modified cleartext data; and
    communicating an output stream including the secure query results over a network along with encrypted metadata indicating an index which separates matching records comprising the secure query results from non-matching records in the output stream to the client device.

2. The method of claim 1, wherein using a security model on the encrypted database to identify the first information and the second information further comprises:
    identifying one or more column-level security settings, and
    based on the one or more identified column-level security settings, associating a first message encryption scheme and a first key with a first column of the modified cleartext data and a second message encryption scheme and a second key with a second column of the modified cleartext data by replacing, by the trusted component, at least one insecure query operator with at least one secure query operator that performs at least one of a filter operator, a join operator, a sort operator, a group operator, an aggregation operator, or an anti-join operator for producing secure query results in compliance with the security model.

3. The method of claim 1, wherein generating the modified cleartext data comprises modifying the cleartext data to generate the modified cleartext data by padding at least a portion of the cleartext data, wherein at least the portion of the modified cleartext data is encrypted upon padding at least the portion of the cleartext data.

4. The method of claim 1, wherein using the security model on the encrypted database to identify the first information and the second information further comprises implementing the security model specifying the first information in the encrypted database permitted for disclosure between the secure query processing system and the client device.

5. The method of claim 1, wherein using the security model on the encrypted database to identify the first information and the second information further comprises executing at least one query trace for a set of cleartext queries to determine the first information in the encrypted database permitted for disclosure.

6. The method of claim 5 further comprising generating a binary string encoding at least a portion of the first information in the encrypted database permitted for disclosure comprising an output size of the secure query results.

7. The method of claim 1, wherein generating the modified cleartext data comprises modifying the cleartext data to generate the modified the clear text data by randomizing an ordering of at least a portion of the cleartext data, wherein at least the portion of the modified cleartext data is encrypted upon randomizing the ordering of the at least portion of the cleartext data.

8. The method of claim 1, further comprising:
    accessing a secure index associated with the encrypted database; and
    executing a lookup on the secure index using an oblivious storage mechanism.

9. The method of claim 1, wherein communicating an output stream including the secure query results further comprises buffering portions of the secure query results.

10. The method of claim 1, wherein communicating an output stream including the secure query results further comprises encrypting at least the portion of the secure query results using a non-deterministic encryption scheme.

11. A secure query processing system comprising:
    a trusted component configured to receive, from a client device, one or more query plans corresponding to a query; and an untrusted component coupled to the trusted component of the secure query processing system, the untrusted component configured to:
  evaluate one or more secure query plans on an encrypted database by using the trusted component to identify sensitive information in the encrypted database, the sensitive information comprising information in encrypted query results to conceal from an adversary based upon a security model that is specified by the client machine;
  determining that upon encrypting a cleartext copy of the encrypted database, results of the encrypted cleartext copy would result in exposure of the sensitive information;
  based on the determining, execute a set of operators in compliance with permitted information to pad the cleartext copy of the encrypted database such that upon encrypting at least a first portion of the padded cleartext copy of the encrypted database, the at least first portion of the padded cleartext copy of the encrypted database does not disclose the sensitive information; and
  encrypt the at least first portion of the padded cleartext copy of the encrypted database in compliance with the security model to produce secure query results that do not disclose the sensitive information, wherein the security model specifies which information in the encrypted database is permitted for disclosure and which information in the encrypted database is not permitted for disclosure during secure query processing, the at least first portion of the padded cleartext copy corresponds to the information in the encrypted database that is not permitted for disclosure and a second portion of the padded cleartext copy corresponds to the information in the encrypted database that is permitted for disclosure, the secure query results including the at least first portion and the second portion of the padded cleartext copy
  communicate an output stream including the secure query results over a network along with encrypted metadata indicating an index which separates matching records comprising the secure query results from non-matching records in the output stream to the client device.

12. The system of claim 11, wherein the untrusted component runs on a network resource that stores the encrypted database and communicates the secure query results to the client machine over a network.

13. The system of claim 11, wherein the untrusted component randomly permutes database records of an input stream to the trusted component.

14. The system of claim 11, wherein the trusted component maintains at least the second portion of the padded cleartext copy of the encrypted database.

15. The system of claim 11, wherein the trusted component processes database records comprising cleartext column data and encrypted column data, executes secure operators on the encrypted column data, wherein execution of the secure operators reveals an output size of the secure query results, and executes traditional operators on the cleartext column data.

16. One or more computer memory devices having computer-executable instructions, which, upon execution on a processor, causes the processor to perform operations, comprising:

implementing a security model specifying first information in an encrypted database permitted for disclosure in encrypted query results and second information in the encrypted database not permitted for disclosure in the encrypted query results;
translating a set of queries into at least one secure query plan based upon the security model, wherein insecure query operators are replaced with secure query operators according to the security model;
requesting evaluation of the at least one query plan with a secure query processing system, the secure query processing system comprises a trusted query processor and an untrusted database management system comprising the encrypted database;
identifying cleartext column data that upon being encrypted would produce encrypted query results that disclose the second information in the encrypted database not permitted for disclosure;
based on identifying the cleartext column data, padding the cleartext column data such that encryption of at least a first portion of the padded cleartext column data corresponding to the second information produces secure encrypted query results that do not disclose the second information;
encrypting the at least first portion of the padded cleartext column data corresponding to the second information in the encrypted database not permitted for disclosure in compliance with the security model to produce the secure encrypted query results, the secure encrypted query results including the encrypted at least first portion and a second portion of the padded cleartext column data without disclosing the second information in the encrypted database not permitted for disclosure;
communicating an output stream including the secure encrypted query results over a network along with encrypted metadata indicating an index which separates matching records comprising the secure encrypted query results from non-matching records in the output stream to a client device; and
decrypting the secure encrypted query results from the secure query processing system.

17. The one or more computer memory devices of claim 16 having further computer-executable instructions, which, when executed on the processor, causes the processor to perform operations, comprising:
  encrypting a portion of the set of queries prior to communication to the untrusted database management system, including encrypting data block identifiers.

18. The one or more computer memory devices of claim 16 having further computer-executable instructions, which, when executed on the processor, causes the processor to perform operations, comprising:
  processing buffered secure query results based upon a selectivity.

19. The method of claim 1, further comprising:
  executing one or more secure operators corresponding to the one or more query plans to compute cleartext data; and
  modifying the computed cleartext data to generate the modified cleartext data; and
  determining whether the modified cleartext data is in compliance with the security model, wherein at least the second portion of the modified cleartext data is encrypted on condition that the modified cleartext data is in compliance with the security model.

20. The one or more computer memory devices of claim 17 wherein a data block corresponding to a given block identifier is stored in different physical locations at different times.

* * * * *